Figure 1:
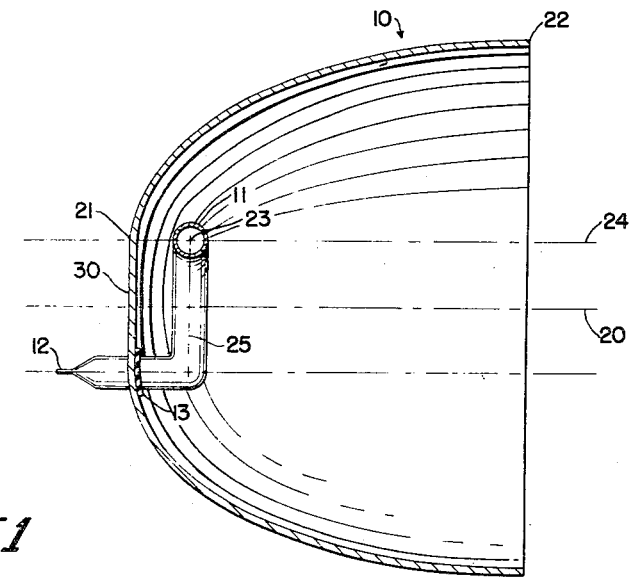

INVENTOR.
ARTHUR L. BINKLEY
KINGSLEY C. ROCK
BY
*Francis A. Sim*
ATTORNEY

United States Patent Office 2,846,565
Patented Aug. 5, 1958

2,846,565

PHOTOGRAPHIC REFLECTOR AND LIGHT SOURCE

Arthur L. Binkley, Denver, and Kingsley C. Rock, Englewood, Colo., assignors to Minneapolis-Honeywell Regulator Company, Minneapolis, Minn., a corporation of Delaware Application June 11, 1956, Serial No. 590,513

2 Claims. (Cl. 240—1.3)

The present invention is concerned with an improved reflector and light source and more particularly with an improved reflector generally of the type used for photographic illumination in combination with a light source so related thereto as to provide optimum illumination conditions for photographic work.

Generally speaking, there are two considerations which are of prime importance in regard to illuminating a subject to be photographed. The first of these, and the one primarily of interest, is the requirement that the subject must be illuminated from a light source of sufficient intensity to provide adequate illumination for a photograph to be taken. The second requirement is that this light source project an even illumination over the subject to be photographed. In other words, the light source must not provide bright spots or any other form of uneven illumination of the object to be photographed since such uneven illumination would be captured on the photographic film with obvious undesired results.

The present invention is concerned with a reflector and light source which provides a high degree of efficiency to adequately illuminate the subject to be photographed and is constructed and arranged to provide substantially constant illumination throughout the area to be photographed.

The intensity of light energy radiated from a light source varies as the square of the distance from the light source. Most photographic cameras encompass a solid viewing angle of approximately 60°. Theoretically speaking, to provide even illumination of a subject to be photographed, in so far as the camera is concerned, the light source illuminating this subject must produce greater illumination on the edges of the solid angle viewed by the camera since this portion of the subject to be photographed is farther from the camera than is the center of the subject.

It is an object of the present invention to provide an improved photographic reflector and light source which is generally open ended and is formed by a surface of revolution consisting of a geometric curve whose major axis is displaced from the axis of revolution and which has a circular light source in the form of a gas filled tube positioned on the locus of the focal point, and further to provide such an improved structure wherein the open end of the reflector and the circular light source define a solid angle of approximately 60°.

Figure 2:
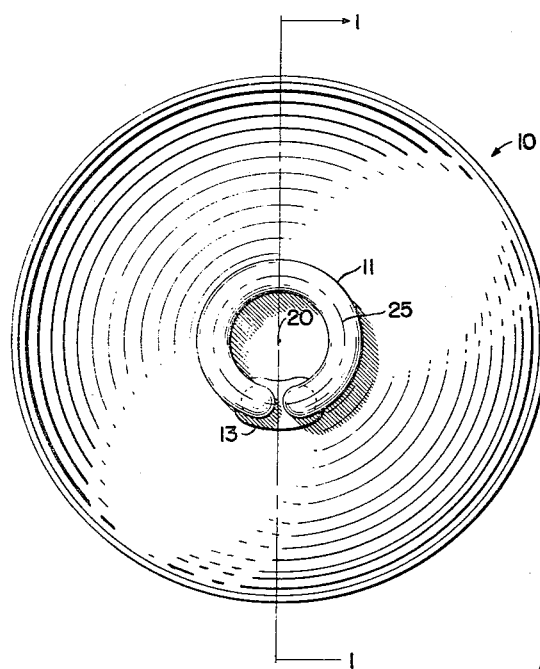

These and other objects of the present invention will be apparent to those skilled in the art upon reference to the following specification, claims, and drawings of which:

Figure 1 is a cross section view of the symmetrical reflector and light source, and Figure 2 is a view of the reflector and light source as seen by the subject to be illuminated.

Referring specifically to Figure 1, the reference numeral 10 designates generally the reflector of the present invention while the reference numeral 11 designates the light source. The reflector 10 and the light source 11 are substantially symmetrical, as can be seen in Figure 2. Reflector 10 may be formed of a metal or other firm material and its inner surface, that is the concave surface viewed in Figure 2, is a polished reflecting surface. The light source 11 may be a gas filled flash tube which has been shown somewhat diagrammatically and consists of a circular hollow glass envelope which is filled with a gas. When a suitable voltage is applied to the electrodes, one of which is shown at 12, the gas is ionized and a pulse of current flows to produce a brilliant flash. An insulating member 13 is provided and along with other means, not shown, mounts the light source 11 with respect to the reflector 10.

The reflector 10 can be described as being generally an open ended ellipsoidal surface. An ellipse is a curve of the general type having a major axis and focal points located on the major axis. The reference numeral 20 designates the axis of symmetry, or axis of revolution, of the device of Figure 1. This axis is an imaginary axis and forms no element of the construction of the device. Considering for a moment the plane surface curve of the reflector from the reference numeral 21 to the reference numeral 22, this surface is an ellipse whose focal point is at 23 and whose vertex is at 21. The reference numeral 22 designates the leading edge of the reflector. The major axis of this ellipse is designated by the reference numeral 24 and is parallel to the axis of revolution 20.

The ellipsoidal surface is formed by revolving the ellipse 21—22 about the axis 20 to form the ellipsoid. The revolution of this ellipse produces a locus of the focal point 23 such as designated by the reference numeral 25 in Figure 2. The revolution of the ellipse 21—22 about the axis of revolution 20 also produces a circular cylinder which is the locus of the major axis 24 of the ellipse 21—22.

The reflector 10 is provided with a substantially flat surface 30 which is substantially circular and corresponds to the circular cylinder transcribed by the locus of the major axis 24, above described. Surface 30 is substantially perpendicular to axis 20.

The flash tube 11 can be considered to be an infinite number of point light sources which are located along the locus 25, referring to Figure 2, of the focal point 23 of ellipse 21—22. With the flash tube 11 so located, the light emitted thereby is reflected out of the open end of the reflector in a definite manner as determined by the characteristics of the curve of reflector 10.

Such a construction and arrangement as above described and disclosed in Figures 1 and 2 yields a light source which is extremely efficient and which provides an ideal condition of illumination of the subject at which the reflector is directed. As has been mentioned, the solid angle viewed by most photographic cameras encompasses a 60° arc. The ellipse portion of the reflector 10 may be constructed so that the ellipse locates the point 22 of the ellipse 21—22 so that a line drawn from this point 22 through the focal point 23 of the ellipse intersects the axis of revolution 20 at a 30° angle. Such a construction provides for placing a maximum amount of light radiating in a 60° solid angle from the reflector 10, this being an optimum match to the viewing angle of the photographic camera.

From the above description it can be seen that we have provided an improved reflector and light source and it is intended that the scope of the present invention be limited solely by the scope of the appended claims.

We claim as our invention:

1. A photographic flash light source comprising; an open end reflector having an axis of symmetry and having a concave surface which is formed as a surface of revolution generated by the rotation about the axis of symmetry of a curve having a focal point which lies on a major axis of the curve, the major axis being parallel to and spaced from the axis of symmetry, said open end of said reflector having a diameter substantially equal to the maximum diameter of said surface of revolution, and a substantially circular photographic flash tube mounted coincident to the locus of the focal point which is formed as the focal point is revolved about the axis of symmetry to thereby cause the light emitted by said flash tube to be reflected out of the open end of said reflector in a definite pattern as determined by the characteristics of said curve.

2. A photographic flash illumination source comprising; an open end concave reflector having the shape of a geometric curve having a focal point which lies in a major axis of the curve, said reflector having an axis of symmetry with the focal point of said geometric curve forming a circle concentric with said axis of symmetry, the leading edge of said reflector extending so that a line from the leading edge through the focal point meets the major axis of the geometric curve at an angle of approximately 30°, and a circular shaped gas filled flash tube positioned coincident with said circle to thereby cause the light produced by said flash tube to be reflected from said reflector in a predetermined manner determined by the characteristics of the geometric curve.

References Cited in the file of this patent

FOREIGN PATENTS

| | | |
|---|---|---|
| 805,860 | France | Sept. 7, 1936 |
| 475,857 | Great Britain | Nov. 26, 1937 |